Feb. 1, 1949.  C. M. WOODRUFF  2,460,326
TRANSMITTER
Filed Feb. 17, 1945  4 Sheets-Sheet 1

INVENTOR.
CLARENCE M. WOODRUFF
BY
William D. Hall
ATTORNEY

Feb. 1, 1949.   C. M. WOODRUFF   2,460,326
TRANSMITTER
Filed Feb. 17, 1945   4 Sheets-Sheet 2
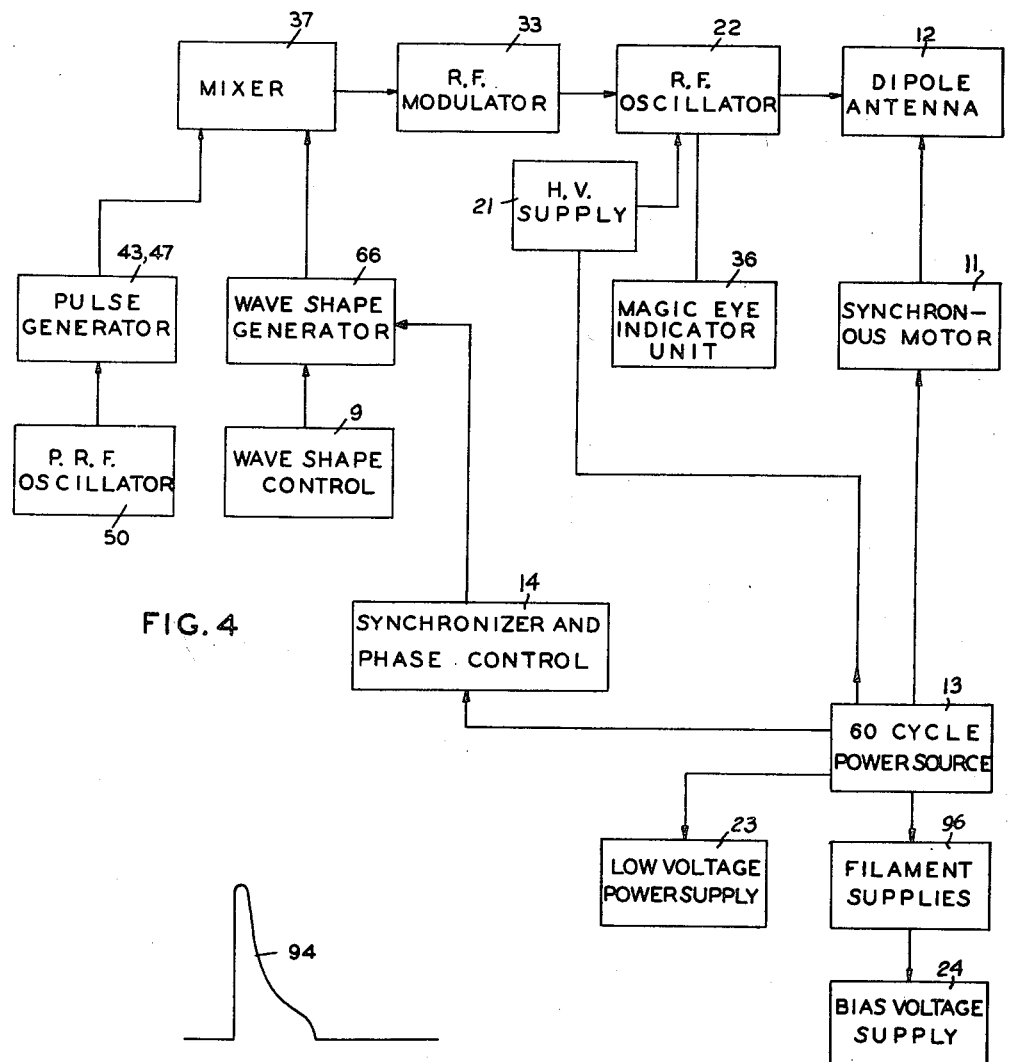
FIG. 4
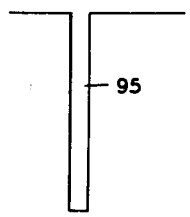
FIG. 6
FIG. 7
INVENTOR.
CLARENCE M. WOODRUFF
BY
ATTORNEY Patented Feb. 1, 1949

2,460,326

UNITED STATES PATENT OFFICE 2,460,326

TRANSMITTER

Clarence M. Woodruff, Dayton, Ohio

Application February 17, 1945, Serial No. 578,422

3 Claims. (Cl. 343—100)

(Granted under the act of March 3, 1883, as amended April 30, 1928; 370 O. G. 757)

The invention described herein may be manufactured and used by or for the Government for governmental purposes, without payment to me of any royalty thereon.

This invention relates to Wurzburg simulators.

An object of this invention is to provide satisfactory means for ground testing a receiver employed as a warning means to warn the pilot of an aircraft in flight that he is within gun-laying range of an enemy radar gun-laying device known as a Wurzburg transmitter.

Another object is to provide circuit means for generating pulses of one to two microseconds duration, employed in the present embodiment at a repetition rate of 1750 cycles per second for early warning and of 3450 cycles per second for gun-laying operations, to correspond to those of a Wurzburg radar.

A further object is to provide a motor-driven rotating dipole antenna such that the polarization of the transmitted wave varies at the rate of 60 cycles per second, to simulate a similar condition in the wave transmitted by the Wurzburg transmitter.

A still further object is to provide means for obtaining amplitude-modulated pulses, the character of the modulation envelope depending on the position of the target with respect to the axis of rotation of the dipole antenna on the Wurzburg transmitter.

A further object is to produce a transmitted polarized wave whose polarization is synchronized with the amplitude modulation introduced by the wave-shaping circuits to simulate all of the possible positions of the aircraft in the field of the Wurzburg transmitter.

A still further object is to provide a means for controlling the wave-shaping unit so that the envelope of the transmitted pulses corresponds to the envelope arriving at a target aircraft in any position with respect to the Wurzburg transmitter.

A further object is to provide circuit means for synchronizing a resistance-capacitance tuned oscillator with an injected frequency. In the present embodiment the 30 cycle oscillator is synchronized with the 60 cycle line supply to simulate all of the possible positions of the aircraft in the field of the Wurzburg transmitter.

Other objects and features of novelty will be apparent from the following description and the annexed drawings, it being clearly understood, however, that the invention is not limited in any way by such description and drawings, or otherwise than by the appended claims.

Fig. 4 is a drawing designating in block form the manner in which the circuit components of this invention are interconnected;

Fig. 6 is a drawing of the wave form designating the pulse output from the cathode of the thyratron tube of the pulse generator circuit;

Fig. 7 is a drawing of the wave form designating the pulse output from the plate of the limiter tube of the pulse generator circuit.

The Germans use a radar of the lobe switching type for early warning and gun-laying operation against allied bombers. The allies have developed an airborne receiver which flashes a warning signal when the bomber in which it is installed is located by the German radar. However, there is no satisfactory means of testing this receiver without installing it in an airplane and flying it over a radar of the Wurzburg type. The Wurzburg simulator hereinafter described has been developed to provide a piece of laboratory test equipment that will simulate the signal received in a bomber flying over a German Wurzburg radar transmitter.

Characteristics of the German Wurzburg radar transmitter

Figure 1:
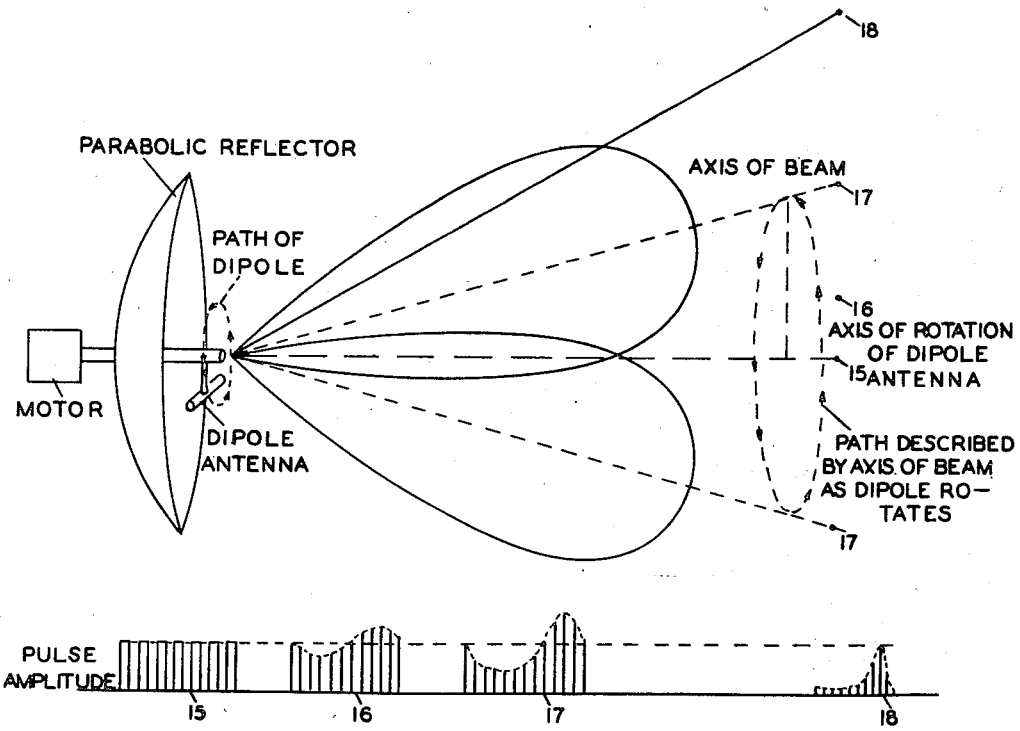
Fig. 1 is a diagram of the field strength pattern of the Wurzburg radar transmitter designating the manner in which the motor rotates the dipole antenna to send out lobe switched conical beam and the relationship of a target with respect to the axis of rotation of said conical beam.

The German Wurzburg is a radar transmitter-receiver of the lobe switching type that is used extensively for early warning and gun-laying operations against allied bombers flying over Germany. This radar transmits pulses of equal amplitude of one to two microseconds duration at a repetition rate of approximately 1750 cycles per second for early warning and 3450 cycles per second for gun-laying operations. These pulses are radiated at a fundamental frequency of from 500 to 600 mc. per second from a rotating dipole whose axis is off set with respect to the axis of rotation as shown in Fig. 1. The axis of rotation is also the axis of a parabolic reflector which concentrates the radiated power into a conical beam. Rotation of the dipole in this fashion causes the center of the beam to sweep through a circular path in space, which is normal to the axis of rotation, at a frequency of 25 to 30 cycles per second. This path is small enough so that an appreciable signal is radiated along the axis of rotation while the peak signal strength occurs at an angle to the axis of rotation as shown in Fig. 1. In other words there is produced a lobe of radiation which rotates about a non-axial ray of the lobe. This type of radar transmitter is referred to herein as a lobe switching transmitter.

*Amplitude characteristics of the Wurzburg signal received by the target airplane*

The signal reaching the target airplane appears as amplitude modulated pulses. The fundamental frequency of the modulation corresponds to the frequency at which the dipole rotates or 25 to 30 cycles per second. The character of the modulation envelope depends upon the position of the target with respect to the axis of rotation of the dipole antenna on the Wurzburg transmitter. If the target is along the axis of rotation 15 of the dipole the amplitude of the received signal remains constant as the center of the beam swings a circular path about the target; this position corresponds to the "on target" position of the radar. At a point 16 slightly off the axis of rotation 15 the amplitude of the pulses reaching the target varies at a 25 to 30 cycle rate and the wave form approaches that of a sine wave. Upon passing farther from the "on target" position 15 the degree of modulation increases and the wave form becomes distorted; the maximum amplitude of the pulses increases slowly while the minimum amplitude decreases rapidly producing a peaked wave form whose amplitude approaches a maximum as the target approaches the axis of the beam 17. A target 18 located considerably beyond the circle described by the axis of the beam 17 receives pulses from the Wurzburg transmitter in groups as the beam swings toward the target; very little if any signal is received as the beam swings away from the target. The amplitude characteristics of the pulsed signal received at the target that have been described hold true along any line normal to the axis of rotation 15 of the dipole. These characteristics may be simulated in a laboratory test set by amplitude modulating a pulse transmitter with a wave form whose characteristics may be varied continuously from those represented at point 15 to those represented at and beyond point 18 of Fig. 1.

*Phase characteristics of the Wurzburg signal received by the target airplane*

The signal transmitted by the Wurzburg is polarized with the dipole antenna. As the dipole rotates in the manner shown in Fig. 1, the polarization of the transmitted signal varies accordingly, producing vertical polarization for two positions of the dipole and horizontal polarization for positions at ±90 degrees from the vertical.

Figure 2:
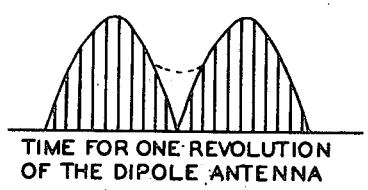
Fig. 2 is a drawing of the wave shape that appears at the terminals of the warning receiver in the target aircraft and which is the result of the rotating polarization of the transmitted wave.

If the target aircraft carries a plane polarized receiving antenna, the signal that arrives at the terminals of the receiver in the aircraft when the aircraft is flying along the axis of rotation 15 of the dipole of the transmitter, will be modulated at a frequency of 50 to 60 cycles per second or at twice the frequency of the rotating dipole. The wave shape will appear as shown in Fig. 2. Imperfect polarization of the receiving antenna or reflections from other parts of the airplane usually prevents the occurrence of a complete null when the receiving antenna is cross-polarized with the dipole antenna, as indicated by the dotted line in Fig. 2.

Figure 3:
Fig. 3 is a drawing of the two extreme characteristic wave forms of the combined amplitude and phase modulation appearing at the terminals of the warning receiver in the target aircraft.

The polarization effect combines with the amplitude modulation effect previously described to produce a complicated wave form when the target plane is not on the axis of rotation of the dipole. The phase at which the two effects combine depends (1) upon the angle at which the receiving antenna is mounted on the target airplane and (2) upon the position of the airplane with respect to the direction in which the Wurzburg transmitter is pointed. To simulate all of these positions an amplitude modulator circuit is provided in this invention, which must be synchronized with the rotating dipole, and the phase of this amplitude modulator must be adjustable over 180 degrees. The two extreme characteristic forms of the envelope of modulation attained when the effects are combined are presented in Fig. 3. In envelope form 19 the phase of the two modulations is such that the peak amplitudes correspond, while in envelope form 20 the peak of the amplitude modulation coincides with the valley of the polarized modulation.

The characteristics of the phase modulated wave produced by relative polarization between the transmitter and receiver antennas may be attained through suitable electrical wave shaping circuits, such as from the output of a full wave rectifier of the proper frequency or by rotating the dipole which transmits the radar pulses. The latter method was considered preferable because of the lack of information as to the degree of polarization of the receiving antenna and because at the time the simulator was designed, information was lacking on the degree of polarization of the wave reaching the airplane. Tests conducted later by observing the received signal in an airplane being tracked by a lobe switching radar of the Wurzburg type have confirmed the wave shapes presented in Fig. 3. The results of the tests also indicated that polarization was a significant factor that in most cases could be simulated satisfactorily by an electrical circuit rather than by using a rotating dipole antenna.

The simulator operates from a power source of 60 cycles per second at 110 volts. The power source operates a synchronous motor 11 that turns the dipole antenna 12 at 30 cycles per second providing the rotating polarization required. Voltage from the alternating current power source 13 is also fed through a phase shifting network and synchronizing circuit 14 that controls the wave shaping unit 66 thus providing both the phase and frequency control that are required.

The wave shape generator consists of a 30 cycles per second oscillator 66 that delivers a sine wave to an amplifier 67 which is biased to introduce distortion that will result in a modulation wave shape of the required type. A suitable control 9 is provided to enable the operator to simulate the wave form of any position from 15 to and beyond 18 of Fig. 1.

The output of the wave shaping circuit is fed into a mixer stage which modulates the amplitude of the incoming pulses from the pulse generator and then feeds the amplitude modulated pulses into a radio-frequency modulator unit. The pulse generator is controlled by a separate oscillator which determines the pulse repetition rates of 1750 and 3450 cycles per second. The radio frequency modulator unit applies the high voltage supply to a radio frequency oscillator in pulses whose amplitude determines the amplitude of the radio frequency oscillations. A small pickup loop transfers part of the energy of the oscillator to the rotating dipole antenna and another pick-up loop supplies a small diode which energizes a magic eye indicator for the convenience of the operator.

The controls available to the operator aside from the main power switch, consist of a motor switch, a switch giving choice of the two pulse repetition frequency rates, a phase control, a wave shape control, and a signal strength or gain control.

The entire electrical circuit including the power supplies is assembled in a single metal chassis and housed in a wood cabinet. The motor and rotating dipole are shock mounted above the cabinet and are protected by a removable wood cover.

Electrical circuits

Figure 5:
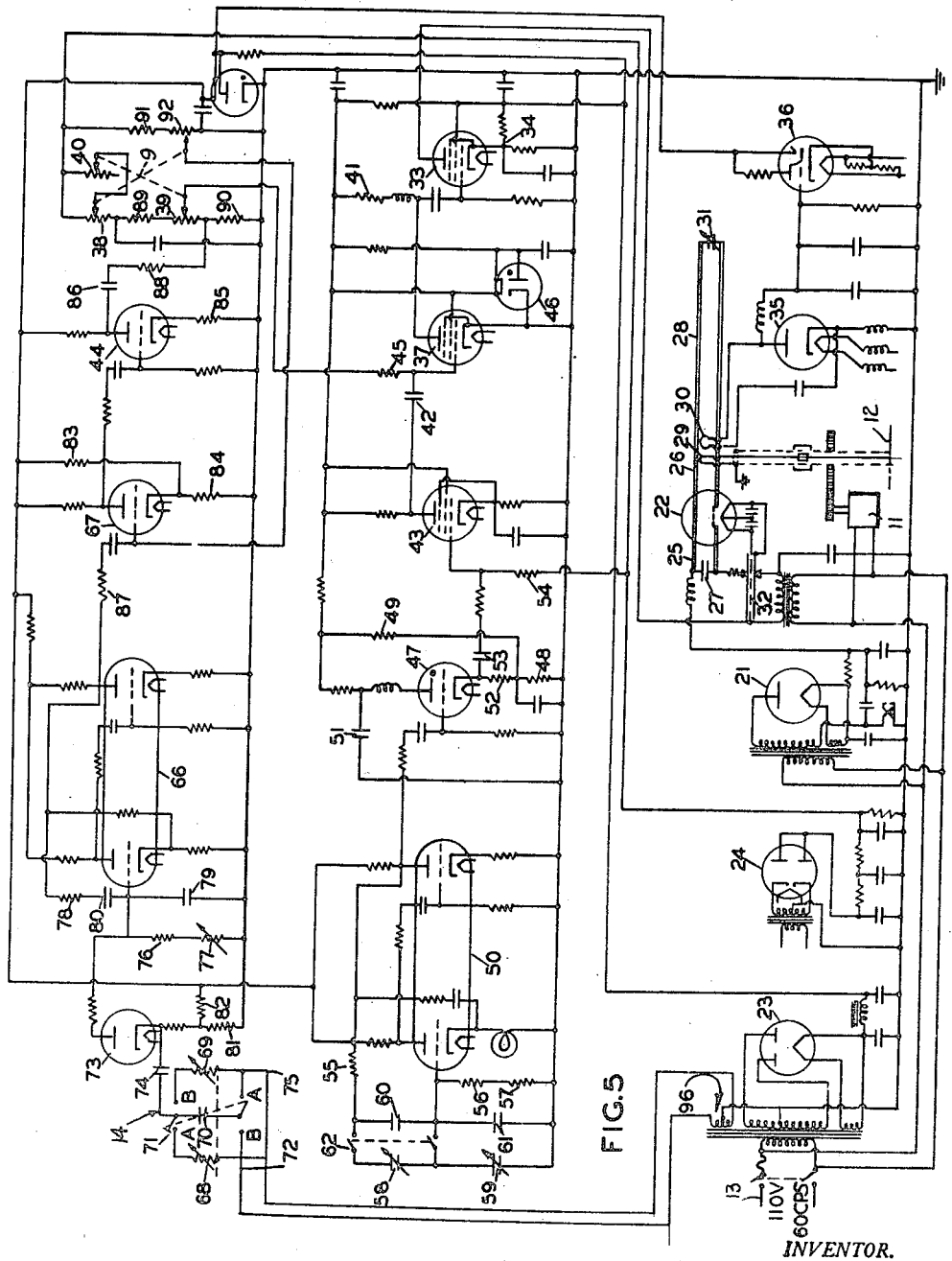
Fig. 5 is a schematic diagram of this invention.

The complete electrical circuit as shown schematically in Fig. 5 consists of the following components:

Power supply

The power supply includes three separate rectifier units. The circuits of these rectifier units are conventional and will not be described in detail. Rectifier 21 provides 1600 volts to high frequency oscillator 22. The current drain is approximately 3 ma. Rectifier 23 provides approximately 100 ma. at 400 volts for the operation of the electrical circuits exclusive of high frequency oscillator 22. Rectifier 24 provides a negative bias supply of approximately 24 volts for various applications wherever a negative bias is required.

High frequency oscillator

The radio frequency pulses are generated by a high frequency triode tube 22. The tube is placed across the open ends of two separate shorted electrical quarter wave lines 25 and 26 to produce a tuned line oscillator 22. One of the shorts is produced by condenser 27, the other by an open quarter wave line 28, thus providing a convenient node from which the power is extracted by two small coupling loops 29 and 30. A small tuning capacitor 31 across the open quarter wave line 28 permits adjusting the frequency of oscillation over a band of approximately 10 megacycles about the fundamental frequency of 550 mc. A tuned line 32 isolates the filaments from ground at the oscillating frequency.

The modulator unit

The oscillator 22 is triggered by a two microsecond positive pulse introduced into the modulator 33, the plate and cathode of which are in series with the plate and cathode of oscillator 22. Modulator 33 is biased to near cut-off by voltage divider 34. A positive pulse of varying amplitude applied to the grid of modulator 33 results in a low impedance path from the cathode of oscillator 22 to ground thus energizing oscillator 22 in such a way that the amplitude of oscillation is determined by the amplitude of the pulse applied to the grid of modulator 33.

The indicator unit

This unit includes a high frequency diode 35 which extracts a small amount of power from oscillator 22 for operation of magic eye tube 36 to provide an indication when oscillator 22 is functioning.

The mixer unit

The mixer unit is a beam power amplifier tube 37 whose bias is determined by the settings of controls 38, 39 and 40. The bias determines the current drain through load resistor 41. The potential drop through resistor 44 appears as a positive pulse on the grid of modulator tube 33 when a negative pulse of sufficient amplitude to produce cut-off is applied to the grid of mixer tube 37. The negative pulse of high amplitude arrives at the grid of mixer tube 37 through condenser 42 from the plate of limiter 43 in the pulse generator unit. The bias voltage of mixer tube 37 is modulated by the output of a conventional triode tube 44 of the wave shaping circuit. This modulation arrives through resistor 45 the impedance of which is low with respect to the impedance of condenser 42 at the frequency of the output of the wave shaping circuit. Voltage regulator 46 supplies a constant voltage to the screen of mixer tube 37 and to the pulse generator.

The pulse generator

The pulse generator consists of a thyratron tube 47 and a limiter tube 43. The thyratron 47 is biased to cut-off by the current flowing through resistor 48 and resistor 49. The thyratron 47 may be self-triggered or ignited by a peaked wave or by a sine wave. In this embodiment the thyratron 47 is ignited by the output of a sine wave oscillator tube 50 which determines the frequency of ignition. Ignition is accompanied by a rapid rise in the potential of the cathode of thyratron 47 followed by a rapid decay as the charge on condenser 51 is drained to ground through resistor 52. The resulting pulse 94 appearing at condenser 53 is shown in Fig. 6. The peak amplitude of this pulse is very high with respect to the cut-off voltage of the following tube, limiter 43 which is biased beyond cut-off by the fixed bias supply. The peak of the pulse drives the grid of limiter 43 slightly positive charging condenser 53. Resistor 54 is very large with respect to condenser 53 so that only a small portion of the charge leaks from condenser 53 between pulses. As a result only the peak of the pulse is effective at the grid of limiter tube 43. The output of limiter 43 appearing at the grid of the mixer 37 is a large negative pulse 95 as shown in Fig. 7.

The pulse repetition frequency oscillator

The pulse repetition rate is determined by the frequency of the sine wave used to ignite thyratron 47. The sine wave generator consists of twin triode tube 50 with the associated resistor-condenser network consisting of resistors 55, 56, 57 and condenser 58, 59, 60 and 61.

The frequency of oscillation is determined by the values of resistors 55, 56 and 57 and condensers 58, 59, 60 and 61. With the double pole single throw switch 62 open, resistor 57 is adjusted to produce a frequency of 3450 cycles per second. Switch 62 is then closed and padder condensers 58 and 59 are adjusted to produce a frequency of 1750 cycles per second of the same amplitude as at the higher frequency. Once these adjustments are made, either of the two pulse repetition rates may be obtained by throwing switch 62 to the desired position.

The wave shape generator

This unit supplies the wave form to mixer stage 37 which modulates the amplitude of the video pulses from the pulse generator stages 43 and 47 to simulate the pattern of pulses observed by a target aircraft. The wave shape generator includes a sine wave oscillator 66 of 30 cycles per second, synchronized with the power source through a phase shifting network, so that the modulated pulses may be applied to the rotating dipole antenna in any phase desired. The 30 cycle sine wave output of oscillator 66 passes through non linear amplifiers 44 and 67 whose characteristics are controlled by the operator to produce the different wave forms observed by a target aeroplane.

The phase shifting network consisting of resistors 68, 69, condenser 70 and switch 71, operates from the 60 cycle output of filament transformer 96 which has the center tap grounded. This results in two sources of voltage that are 180° out of phase with respect to each other. With switch 71 in position A—A, condenser 70 is placed in series with variable resistor 68. If resistor 68 is adjusted to give zero resistance, then the voltage at terminal 72 will be applied to the cathode of diode tube 73 through condenser 74. If resistor 68 is adjusted to a maximum the voltage at terminal 75 will be applied to the cathode of diode tube 73. The setting of resistor 68 shifts the phase of the output voltage continuously over 180 degrees. Since this source of voltage is used to synchronize oscillator 66 operating at one half the frequency of the 60 cycle line supply, 180 degrees phase shift of the 60 cycle supply will result in only 90 degrees phase shift in 30 cycle oscillator 66. An additional 180 degree phase shift of the line supply is obtained by switching switch 71 to position B—B and varying resistor 69 from a minimum to a maximum.

The oscillator and synchronizing circuit include tubes 73 and 66. The oscillator section is a twin triode tube 66.

Figure 8:
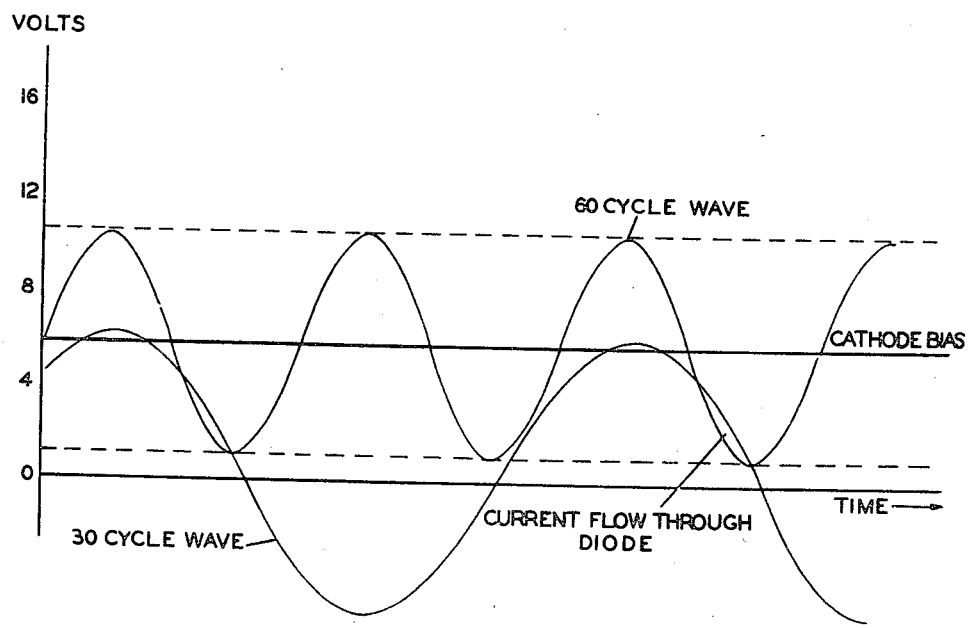
Fig. 8 is a drawing of two wave forms designating the manner in which the 60 cycle per second synchronizing wave locks the 30 cycle per second wave into step so that current flows only for a small part of each cycle.

The frequency of oscillation is determined by the values of resistors 76, 77 and 78 and condensers 79 and 80. When $C79=C80$ and $R76+R77=R78$, the frequency of oscillation corresponds to the frequency at which $Xc=R$. Decreasing the value of R increases the frequency of oscillation. In this application the value of resistance 77 is increased so that oscillator 66 functions at a frequency slightly less than 30 cycles per second. The frequency of oscillation is then brought up to 30 cycles per second by diode 73 whose cathode is fed by the 60 cycle voltage from the phase shift network. The potential divider consisting of resistances 81 and 82, holds the cathode of diode 73 above ground potential so that the plate of tube 73 which is attached to the input grid of tube 66 will not pass current unless the frequency of oscillator 66 lags the 30 cycle frequency which it is supposed to generate. If oscillator 66 does lag behind 30 cycles per second the plate of tube 73 passes current to raise the frequency to 30 cycles per second. The manner in which the 60 cycle per second synchronizing wave locks the 30 cycle per second wave into step is shown in Fig. 8. A current flowing for a small part of each cycle as the plate of tube 73 becomes positive with respect to the cathode, provides the resistance in shunt with resistance 76 and resistance 77 to raise the frequency of oscillator 66 the required amount. This same type of synchronizing circuit may be applied to a phase-shift type of oscillator.

The wave shaping circuits, vacuum tubes 67 and 44 receive the sine wave output of the 30 cycle per second oscillator 66. Tube 67 is biased near cut-off by a voltage divider consisting of resistors 83 and 84, and tube 44 is operated with a small bias developed by cathode resistor 85. A small voltage applied to the grid of tube 67 will be amplified and appear at the output of tube 44 in a undistorted form. This operation simulates the wave form as the target plane approaches point 15 from point 16 as shown in Fig. 1. A large voltage applied to the grid of tube 67 will drive the grid close to cut-off, clipping the positive peak of the wave appearing at the grid of tube 44. The grid of tube 44 which operates very near the potential of the cathode will draw current on the positive peak of the wave, clipping it more so that the inverted output wave appearing at condenser 86 is of the form shown at point 17. Increasing the negative bias on the grid of tube 67 increases the effects just described until in the limiting condition a peaked wave of the form shown at point 18 is obtained.

Proper control of the voltage of the input sine wave and of the bias of tube 67 thus produce the types of output waves required and shown in Fig. 1. The problem is to obtain a suitable system whereby the required wave forms may be obtained by a single adjustment or control that will operate independently of the output levels or signal strengths which may be selected by a second control.

The wave shape and gain control

The wave shape and gain control unit consists of resistors 87, 88, 38, 89, 39, 90, 40, 91, 92 and by-pass condenser 93. Resistors 39 and 40 are ganged potentiometers providing a gain control while resistors 38 and 92 are ganged potentiometers that control simultaneously the wave shape and the amplitude of the wave associated with different positions of the target aeroplane in the field of the Wurzburg radar. The operation of this unit is as follows: The output of the sine wave oscillator 66 is applied to the grid of tube 67 from the potential divider consisting of resistors 87, 92 of which resistor 92 is a potentiometer with the end grounded. The amplitude of the voltage from oscillator 66 reaching the grid of tube 67 is a maximum when all of the resistance of potentiometer 92 is between the grid of tube 67 and ground. The amplitude of the voltage applied to the grid of tube 67 is reduced to zero by shifting potentiometer 92 to eliminate all of the resistance between the grid of tube 67 and ground. Because of the bias current flowing through potentiometer 92 the adjustment for maximum voltage also corresponds to an increase of the grid bias thus clipping the wave to simulate the off-target position, whereas the adjustment for minimum voltage corresponds to less bias so that no distortion of the voltage wave occurs.

The arm of potentiometer 92 is also ganged with the arm of potentiometer 38 which is one of the elements in the voltage divider that controls the bias of mixer 37. When the arm of potentiometer 92 is moved to the bottom corresponding to a position along the axis of the radar reflector where the amplitude of the modulation is low, the arm of potentiometer 38 moves upward so that less current flows through the voltage divider consisting of resistances 38, 89, 39 and 90. This raises the fixed potential of the grid of mixer 37 so that pulses of large amplitude are produced when the pulse generating circuit drives the grid of tube 37 to cut-off. When the arm of potentiometer 92 is moved upward corresponding to a target position at the edge of the radar beam, the arm of potentiometer 38 moves downward increasing the bias on mixer 37 so that the amplitude of the output pulses is decreased. The degree of control of pulse amplitude exerted by potentiometer 38 depends upon the setting of the arm on potentiometer 40, to which it is attached and which is ganged with the gain control potentiometer 39. When the arm on potentiometer 39 is moved to the lower position, the amplitude of the voltage from the last tube 44 of the wave shape generator that is applied to the grid of the mixer tube 37 is a maximum, corresponding to a target very near the radar. Simultaneously, the arm of potentiometer 40 is at the upper end so that movement of the arm of potentiometer 38 produces a maximum change in the bias voltage on the mixer 37. When the arm of potentiometer 39 is moved upward to reduce the amplitude of the modulation reaching the grid of the mixer tube 37, this change also increases the negative bias so that the percentage modulation remains nearly constant. In order that the shifting of the positioning control 38 will exert a proportionately smaller effect, the arm of potentiometer 40 which is ganged with the arm of potentiometer 39 moves down so that potentiometer 40 parallels potentiometer 38. The net result of the adjustment of gain control 39, 40 is a simultaneous change in both signal strength and bias supplied to the grid of mixer tube 37 with proper moderation of the effects of the positioning control 38, 92 at the reduced operating voltages. Operating in this fashion the gain control may be varied giving any desired signal strength, without changing the wave shape corresponding to a given setting of the positioning control.

Using the two controls just described, that is, the gain control and the positioning control, and with the phase control described under the phase shift network the operation of this set will duplicate the type of signal received by a target aeroplane anywhere in the field of a gun-laying or early warning type of German Wurzburg radar.

What is claimed is:

1. Testing means comprising, a transmitter, stationary electronic means in said transmitter selectively adjustable to produce a modulation wave having an intensity fluctuation reproducing the fluctuation of field intensity at a stationary point in the field of a lobe of radiation rotating about a non-axial ray of the lobe, means amplitude-modulating a train of pulsed oscillations in accordance with the modulation wave, a rotating polarized antenna radiating the modulated pulsed oscillations, and means for synchronizing and phasing the rotation of said antenna with respect to the fluctuations of the modulation wave.

2. A generator of an amplitude-modulated train of pulsed oscillations comprising, an oscillator generating pulses of radio frequency oscillations, a generator of electrical sine waves, means for adjustably clipping portions of the sine waves so generated, means for modulating the amplitudes of the pulses of radio frequency oscillations in accordance with the clipped sine waves, a rotating antenna for radiating the modulated pulses of radio frequency, and means for synchronizing and phasing said rotating antenna with said generator of electrical sine waves.

3. A generator of a modulated train of pulsed oscillations comprising, a generator of a train of direct current electrical pulses, a generator of electrical sine waves, means for adjustably clipping portions of the sine waves so generated, means for modulating the amplitudes of the direct pulses in accordance with the clipped sine waves, means generating a train of pulsed radio oscillation having amplitudes from pulse to pulse in accordance with the modulated train of direct pulses, a rotating antenna for radiating the radio pulses, and means for synchronizing and phasing said generators with said antenna.

CLARENCE M. WOODRUFF.

REFERENCES CITED

The following references are of record in the file of this patent:

UNITED STATES PATENTS

| Number | Name | Date |
|---|---|---|
| 1,821,383 | Goldsmith | Sept. 1, 1931 |
| 1,823,794 | Esau | Sept. 15, 1931 |
| 2,132,654 | Smith | Oct. 11, 1938 |
| 2,266,194 | Guanella | Dec. 16, 1941 |
| 2,340,539 | Koschmieder | Feb. 1, 1944 |
| 2,358,544 | Tolson | Sept. 19, 1944 |
| 2,401,807 | Wolff | June 11, 1946 |
| 2,412,964 | Chatterjea | Dec. 24, 1946 |